(12) United States Patent
Hillam

(10) Patent No.: US 11,897,417 B2
(45) Date of Patent: Feb. 13, 2024

(54) SAFETY BELT AND SAFETY HARNESS SEPARATING AND FASTENING SYSTEM

(71) Applicant: Izac Hillam, St. Anthony, ID (US)

(72) Inventor: Izac Hillam, St. Anthony, ID (US)

(*) Notice: Subject to any disclaimer, the term of this patent is extended or adjusted under 35 U.S.C. 154(b) by 43 days.

(21) Appl. No.: 17/854,885

(22) Filed: Jun. 30, 2022

(65) Prior Publication Data

US 2023/0056915 A1 Feb. 23, 2023

Related U.S. Application Data

(60) Provisional application No. 63/234,024, filed on Aug. 17, 2021.

(51) Int. Cl.
*B60R 22/24* (2006.01)

(52) U.S. Cl.
CPC .................................. *B60R 22/24* (2013.01)

(58) Field of Classification Search
CPC .......... B60R 22/00; B60R 22/30; B60R 22/24
See application file for complete search history.

(56) References Cited

U.S. PATENT DOCUMENTS

| | | | | |
|---|---|---|---|---|
| 3,258,293 | A * | 6/1966 | Sharp ..................... | B60R 22/023 297/483 |
| 8,011,730 | B2 * | 9/2011 | Greenwood ....... | B60N 2/42709 297/468 |
| 8,210,617 | B2 * | 7/2012 | Aaron .................. | B60N 2/2866 297/484 |
| D685,958 | S * | 7/2013 | Wolfson ....................... | D30/154 |
| 8,919,882 | B2 * | 12/2014 | Greenwood ........... | B60N 2/163 297/468 |
| 8,998,286 | B2 * | 4/2015 | Greenwood ......... | B60N 2/4242 297/483 |
| 2005/0217608 | A1 * | 10/2005 | Johnson .................. | B60R 22/18 119/771 |
| 2009/0014991 | A1 * | 1/2009 | Smyth ..................... | B60R 22/00 280/734 |
| 2010/0102602 | A1 * | 4/2010 | Hansen .................. | B64D 11/06 297/216.1 |
| 2011/0291454 | A1 * | 12/2011 | Greenwood ....... | B60N 2/42709 297/344.12 |
| 2012/0274056 | A1 * | 11/2012 | Fan ........................ | B60R 22/00 280/801.1 |
| 2013/0249204 | A1 * | 9/2013 | Fink ..................... | B60R 22/024 280/801.1 |
| 2013/0307312 | A1 * | 11/2013 | Greenwood ....... | B60N 2/01508 297/468 |
| 2015/0069813 | A1 * | 3/2015 | Furr ....................... | B60R 22/00 297/484 |

FOREIGN PATENT DOCUMENTS

AU       2018201408 A1 *  3/2018

* cited by examiner

*Primary Examiner* — Nicole T Verley

(57) ABSTRACT

A system includes a coupler with a first arm and a second arm. The first and second arms configured to couple to a roll cage. A first end may include a first recessed portion and a first aperture. A third end may include a second recessed portion and a second aperture. The first and third ends may contact each other and be secured together via a first fastener that passes through the first aperture and the second aperture. Further, the first recessed portion and the second recessed portion may receive a second fastener therebetween that may receive a latch plate of a safety belt or safety harness to maintain it in an upward position.

9 Claims, 13 Drawing Sheets

SAFETY BELT AND SAFETY HARNESS SEPARATING AND FASTENING SYSTEM

CROSS-REFERENCE TO RELATED APPLICATIONS

This application claims the benefit of U.S. Provisional Application Ser. No. 63/234,024, filed on Aug. 17, 2021, which is incorporated herein by reference.

TECHNICAL FIELD

The present disclosure relates to safety belts and safety harnesses. More particularly, the present disclosure relates to a separating and fastening system to maintain safety belts and safety harnesses in an untangled and easy to access configuration.

BACKGROUND

Safety belts and safety harnesses have been around for many years to protect individuals in many types of vehicles, such as cars and airplanes. In particular, belts and harnesses are capable of preventing harmful movements of a passenger during a collision or an abrupt stop. There are numerous types of belts and harnesses, which may vary in connection points, such as two-point to seven-point. More recently, safety belts and harnesses have been placed in side-by-sides (i.e., UTVs) to help protect drivers and passengers. Belts and harnesses in a side-by-side are important due to the precarious driving conditions that are often encountered.

While belts and harnesses are a critical component to all types of vehicles, especially off-road vehicles and airplanes, their configurations have many downsides. For example, due to the numerous straps and buckles, the belts and harnesses have a tendency to twist, turn, and become tangled. This often leads to user frustration and, in some instances, drivers and/or passengers may decide not to take the time to untangle the belt or harness and ultimately, go without wearing it, which may place the driver and/or passengers in unnecessary harm. In addition, unsecured safety belts or safety harnesses can cause a lot of damage to the interior of vehicles by bouncing repeatedly against plastic or metal within the interior of the vehicle.

Accordingly, there is a need for a system that maintains seat belts or harnesses in an easy to access and untangled configuration when not in use. The present invention seeks to solve these and other problems.

SUMMARY OF EXAMPLE EMBODIMENTS

In one embodiment, a safety belt and safety harness separating and fastening system (hereinafter referred to as the "system") includes a first seat belt coupler with a first arm and a second arm. The first arm comprises a first end and a second end, the second end opposite the first end. The second arm may comprise a third end and a fourth end, the fourth end opposite the third end. The first end may comprise a first recessed portion and a first aperture. The third end may comprise a second recessed portion and a second aperture. The first and second arms may be removably attachable to each other. In particular, in one embodiment, the first end and the third end may contact each other and be secured together via a first fastener that passes through the first aperture and the second aperture. Further, the first recessed portion and the second recessed portion may receive a second fastener therebetween. The second fastener being configured to receive a latch plate of a safety belt or safety harness.

In one embodiment, a method of using the first coupler comprises attaching the coupler to the tube of a roll bar cage. In particular, the first arm and the second arm may wrap around the tube and be secured thereto via the first fastener. When a user unbuckles the safety belt or safety harness, the user may attach the latch plate to the second fastener, thereby allowing unobstructed exit from the vehicle. If a user attempts to use the safety harness in a first position, the user would have to sit on the seat and lift the straps of the safety harness to insert both arms. However, the system allows the safety harness to be moved from the first position to a second position, which is the safety harness in an upward position coupled to the first seat belt couplers. If a user enters the vehicle with the safety harness in the second position, the user can simply grab the harness and pull it away from the couplers and over their shoulders to buckle, instead of having to untangle and maneuver to buckle the safety harness.

In one embodiment, a system comprises a second seat belt coupler which may include a plate with an upper surface and a lower surface. The plate may be rectangular or any other shape. The upper surface may comprise a first plate aperture with a first recessed ledge and a second plate aperture with a second recessed ledge. The first aperture and second aperture may each receive a first plate fastener, such as a screw, so as to attach the second coupler to a vehicle. The upper surface may also comprise a second coupler aperture that may be cylindrical to receive a second plate fastener. The coupler is attached to the vehicle via the first plate fastener. In some embodiments, the lower surface may comprise an adhesive layer that can attach the coupler to any surface with or without the first plate fastener. A release liner may be coupled to the adhesive layer so as to protect it. When a user desires to apply the coupler having the adhesive layer, the user may remove the release liner and adhere the coupler to a vehicle surface. The coupler is then attached to an interior of a vehicle. A latch plate of a safety belt or safety harness may be attached to the second plate fastener on the coupler, allowing a user to easily access the safety belt or harness and preventing damage to the belt or harness and/or interior of the vehicle.

DETAILED DESCRIPTION OF EXAMPLE EMBODIMENTS

Figure 1:
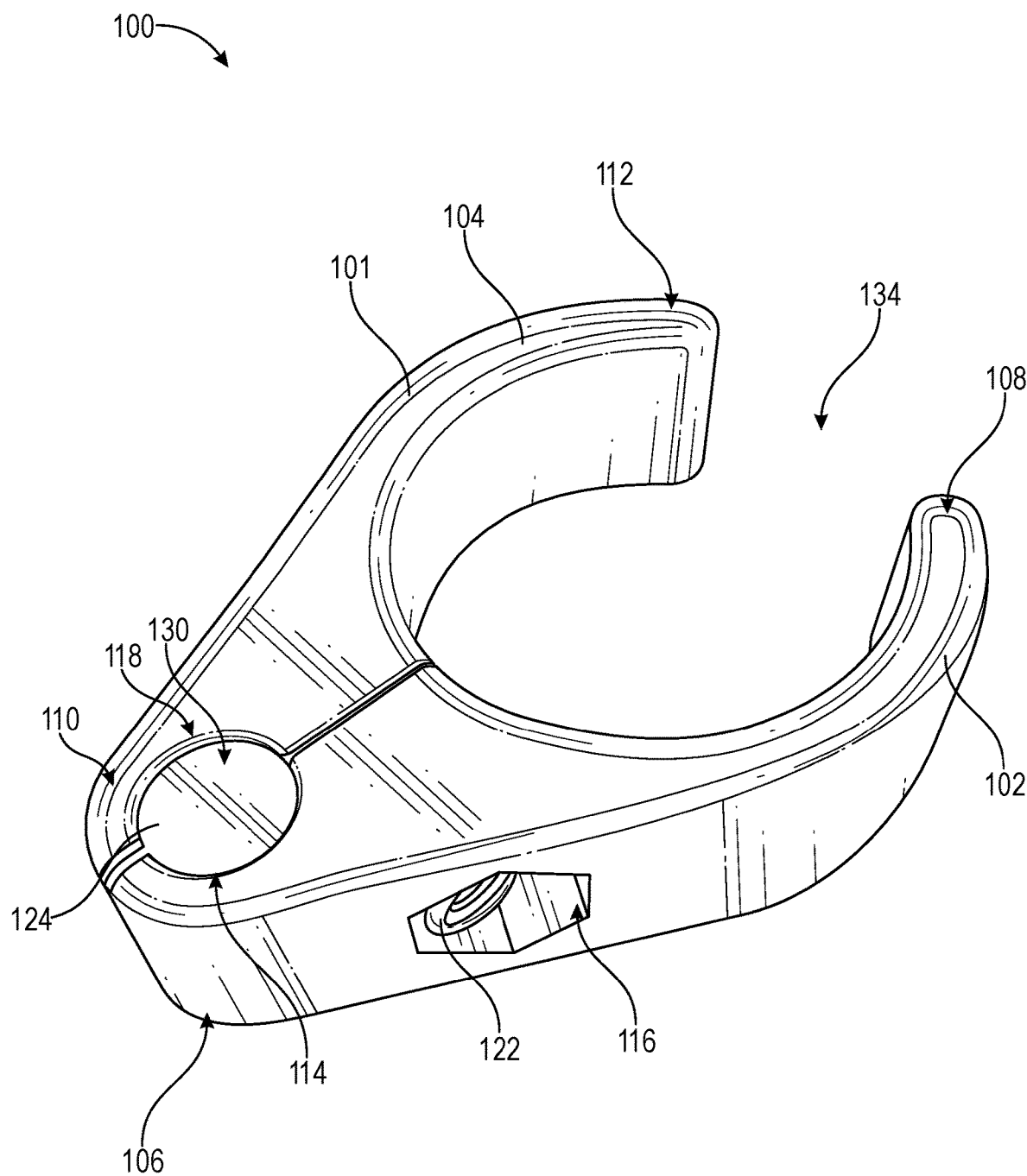
FIG. 1 illustrates a top, side perspective view of a first harness coupler of a safety belt and safety harness separating and fastening system.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

It will be understood that the detailed description depicts only example embodiments, which are not to be considered limiting in scope. Reference to the invention, the present disclosure, or the like are not intended to restrict or limit the invention, the present disclosure, or the like to exact features or steps of any one or more of the exemplary embodiments disclosed herein. References to "one embodiment," "an embodiment," "various embodiments," and the like, may indicate that the embodiment(s) so described may include a particular feature, structure, or characteristic, but not every embodiment necessarily includes the particular feature, structure, or characteristic. In addition, repeated use of the phrase "in one embodiment," or "in an embodiment," do not necessarily refer to the same embodiment, although they may refer to the same embodiment.

The particular arrangements disclosed herein are meant to be illustrative only and not limiting as to the scope of the invention. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described.

It will be understood that the steps of any such processes or methods are not limited to being carried out in any particular sequence or arrangement. In fact, the steps of the disclosed processes or methods generally may be carried out in various different sequences and arrangements while still falling within the scope of the present disclosure.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously described, there is a need for a system that maintains seat belts and/or harnesses in an easy to access and untangled configuration when not in use. The present invention seeks to solve these and other problems.

Safety belts and safety harnesses are used by many individuals in numerous vehicles. Vehicles where safety belts or harnesses are used include cars, trucks, airplanes, side-by-sides, tractors, and many other types of vehicles. Belts and harnesses are capable of keeping individuals within the vehicle, thereby preventing ejection therefrom. Many belts and harnesses have considerable variations. However, most belts and harnesses include numerous straps and at least one latch plate capable of coupling to a buckle.

While these belts and harnesses are a critical component to all types of vehicles and keep many individuals safe, they also have shortcomings. For example, due to the numerous straps and buckles, the belts and harnesses have a tendency to twist, turn, and become tangled. This may create frustration for a user. If the user is in a hurry, then the seat belt or harness may not be worn or may be worn improperly. In either circumstance, an unsafe riding condition is created. Further, unsecured seat belts or harnesses may beat against a vehicle when it is moving, thereby damaging the vehicle and/or causing belt or harness components to wear out at an increased rate.

The systems described herein comprise a first harness coupler with a first and a second arm. One end of the first and second arms may be secured to a tube (e.g., a roll bar or frame). An opposite end of the first and second arms may be secured together via a fastener and include a magnet therein. It will be appreciated that the first harness coupler may attach to an interior of the vehicle so as to allow a user to attach a first latch plate of a safety belt or harness to the magnet. When the latch plate is attached to the magnet, the seat belt or harness may maintain an untangled configuration, allowing a user to more easily enter and secure the safety belt or harness. Additionally, a second harness coupler may include a plate with an upper surface and a lower surface. The plate may be secured to any surface within the vehicle. Accordingly, a user may secure the second harness coupler to a convenient location so as to be accessible by a second latch plate of a seat belt or harness. It will be appreciated that a user may more easily enter a vehicle, with the seat belt or harness being out of the way, and more easily attach the first and second latch plates to their respective buckles.

Figure 2:
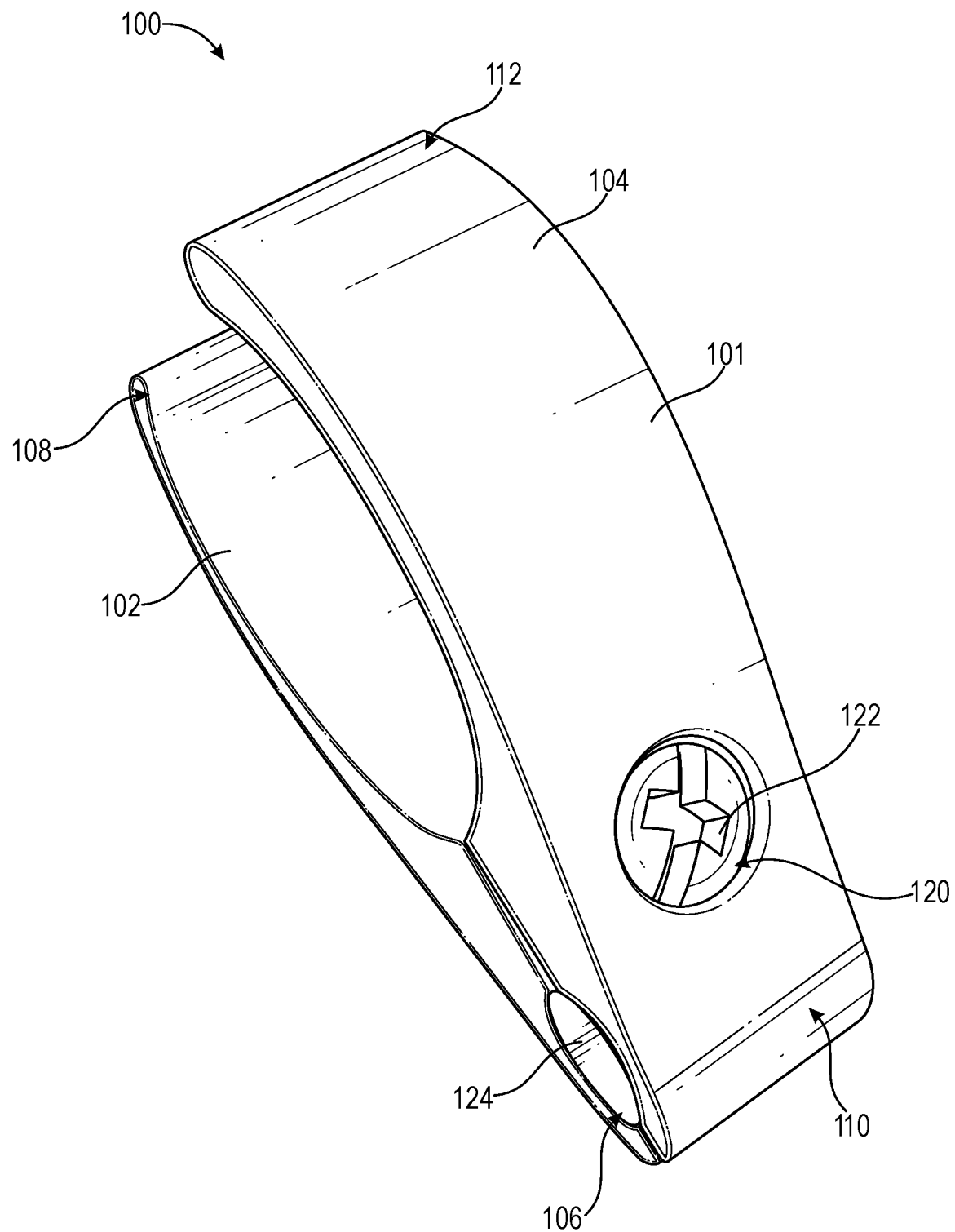
FIG. 2 illustrates a bottom, side perspective view of a first harness coupler of a safety belt and safety harness separating and fastening system.
Figure 3:
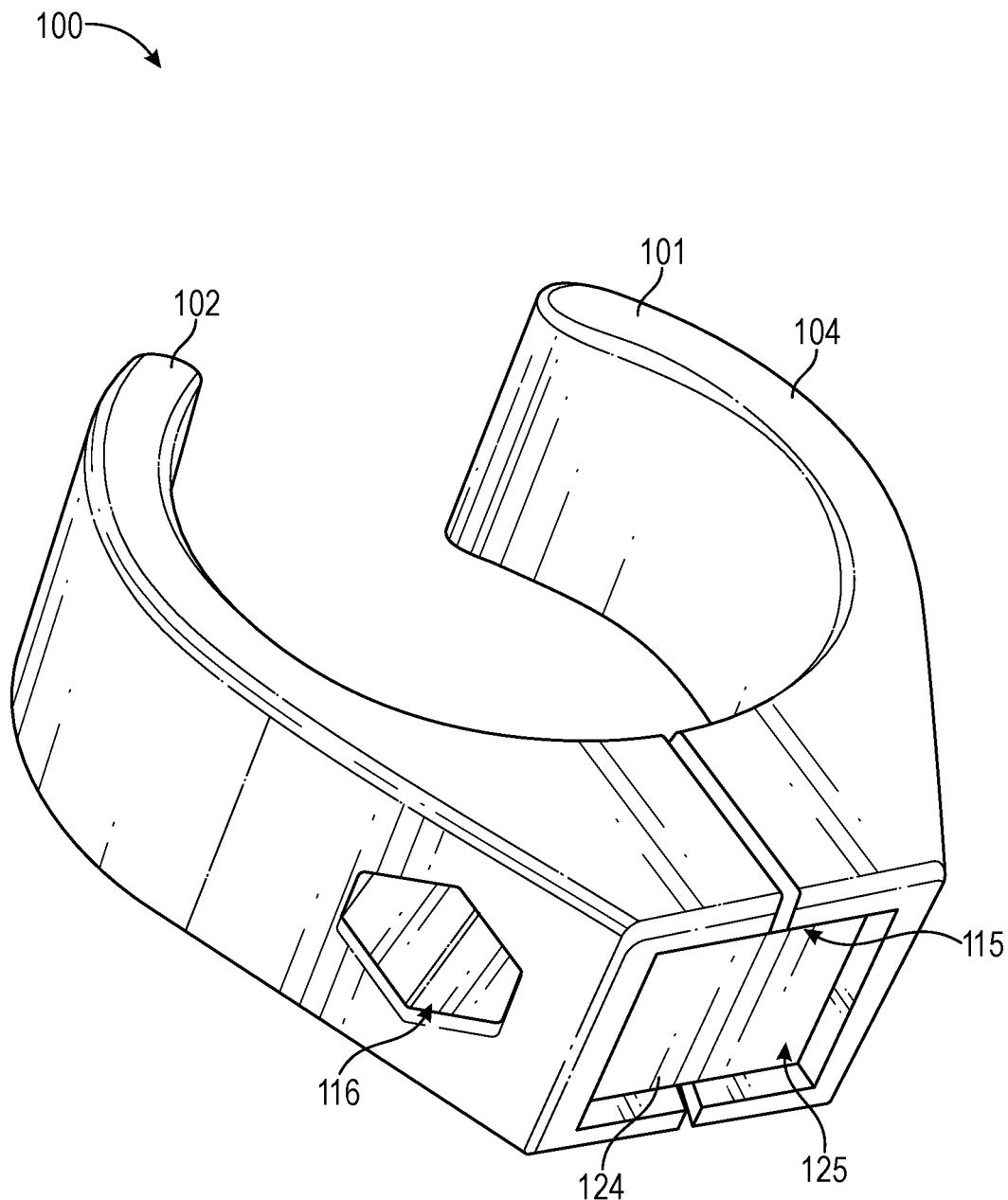
FIG. 3 illustrates a top, side perspective view of a first harness coupler of a safety belt and safety harness separating and fastening system.

As shown in FIGS. 1-3, in one embodiment, a system 100 includes a first harness coupler 101 comprising a first arm 102 and a second arm 104. The coupler 101 may be manufactured from plastic, aluminum, carbon fiber, silicone rubber, or any other type of material. In some embodiments, the first harness coupler 101 may be manufactured of a ferromagnetic material, such as iron, cobalt, nickel, and some alloys of rare earth metals. The first arm 102 comprises a first end 106 and a second end 108, the second end 108 being opposite the first end 106. The second arm 104 may comprise a third end 110 and a fourth end 112, the fourth end 112 being opposite the third end 110. The first arm 102 and the second arm 104 may each be curved or angled so as to mirror the shape of a roll bar or frame of a vehicle.

The first end 106 may comprise a first recessed portion 114 and a first aperture 116. The third end 110 may comprise a second recessed portion 118 and a second aperture 120. The first and second arms 102, 104 may be removably attachable to each other. In particular, in one embodiment, the first end 106 and the third end 110 may contact each other and be secured together via a first fastener 122 that passes through the first aperture 116 and the second aperture 120, thereby securing the first end 106 to the third end 110. The first fastener 122 may be a nut and bolt. In some embodiments, the first fastener 122 may be a screw, rivet, adhesive, or any other coupling mechanism. While the first harness coupler 101 is shown as having a first arm and a second arm that are coupled together via the first fastener, it will be appreciated that the first harness coupler 101 may be a single unit with a flexible first arm and a flexible second arm, with or without bands to secure the single unit to a vehicle, the bands being placed between the flexible first and second arm. In an alternate embodiment, the first harness coupler 101 may be a single, circular, adjustable coupler.

Further, the first recessed portion 114 and the second recessed portion 118 may receive a second fastener 124 (e.g., a magnet) thereinbetween. The second fastener 124 may be cylindrical in shape; however, any other shape may be used, such as square or rectangular. The second fastener 124 may receive first latch plates 126 (e.g., shoulder strap latch plates) of a safety belt or safety harness 128 (shown in FIG. 6) so as to keep the belt or harness untangled and in an easy to access position. The first recessed portion 114 and the second recessed portion 118, when adjacent each other and attached, may create a circular aperture 130 so as to receive the second fastener 124. In some embodiments, a square-shaped aperture, or other shaped aperture, may be created to receive the second fastener. Accordingly, when the first and second arms 102, 104 are attached to each other, the second fastener 124 is secured in a stationary position. While a magnet is shown, it will be understood that a clip, hook and loop, clamp, or any other coupling mechanism may be used to receive and secure the first latch plates 126. Further, in some embodiments, as shown in FIG. 3, the first and second recessed portions 114, 118 may be at a bottom 115 of the first and second arms 102, 104 near the first and third ends 106, 110 and form a square-shaped recession 125 to receive the second fastener 124. It will be appreciated that the first and second recessed portions 114, 118 may be positioned at numerous locations on the first harness coupler 101 and may be any shape as previously discussed.

In addition, the second end 108 of the first arm 102 and the fourth end 112 of the second arm 104 may circumscribe a majority of a tube 132 (shown in FIG. 6), such as a roll bar on an off-road vehicle. A gap 134 may be positioned between the second end 108 and the fourth end 112. In some embodiments, the gap 134 may be of numerous widths. In some embodiments, the gap 134 may not exist and the second end 108 and the fourth end 112 may be in contact with each other. It will be appreciated that one or more couplers may be used in a vehicle. For example, one coupler may be used or multiple couplers may be used to receive the first latch plates 126 of the safety belt or safety harness 128. It will further be appreciated that the coupler 101 may be positioned anywhere within a vehicle and once placed in the vehicle, may be repositioned to any location. In some embodiments, the first harness coupler 101 may comprise a first size 131A, a second size 131B, and a third size 131C (Shown in FIG. 15). The first size 131A may be smaller than the second size 131B, and the second size 131B may be smaller than the third size 131C. While only three sizes are shown, it will be understood that there may be more or less than three different sizes. Furthermore, in some embodiments, the first harness coupler 101 may be color-coded to indicate its size. As an example, the first size may be red, the second size gray, and the third size black. Other indicia, such as numbers, may be placed on the first harness couplers 101 to distinguish the various sizes.

Figure 4:
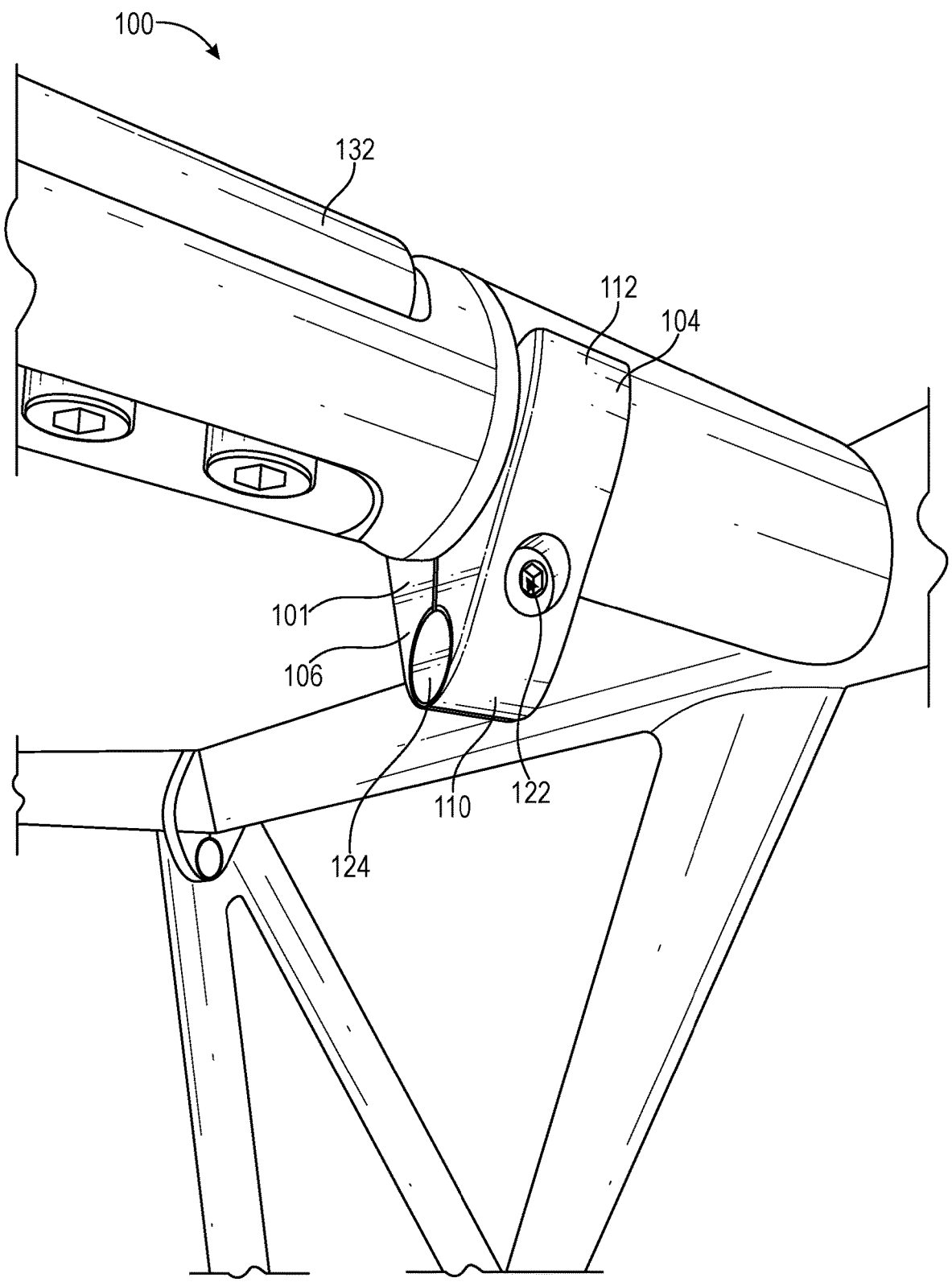
FIG. 4 illustrates a front perspective view of a first harness coupler fastened to a vehicle.
Figure 5:
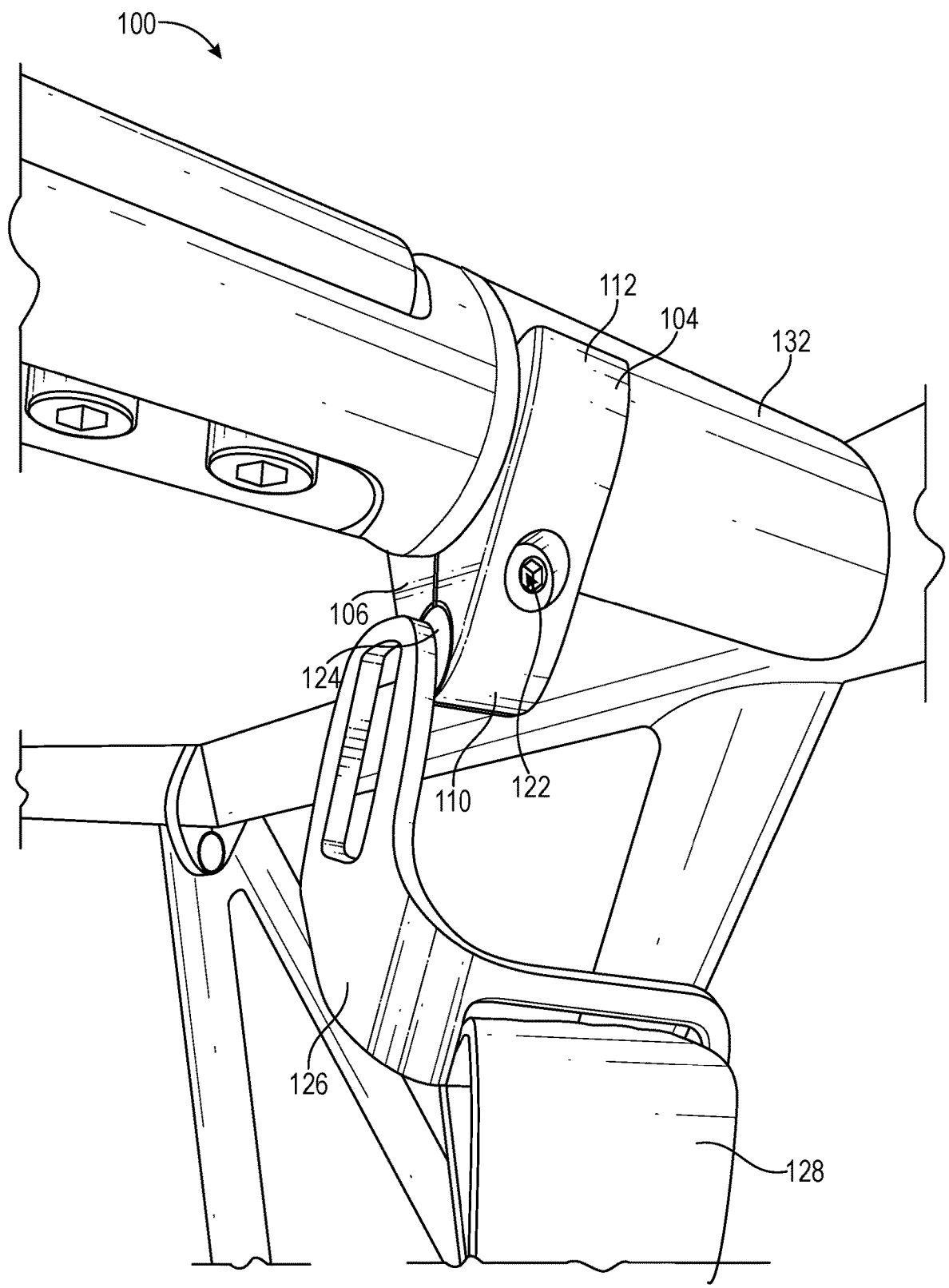
FIG. 5 illustrates a front, side perspective view of a first harness coupler with a first latch plate of a seatbelt or harness attached thereto.
Figure 6:
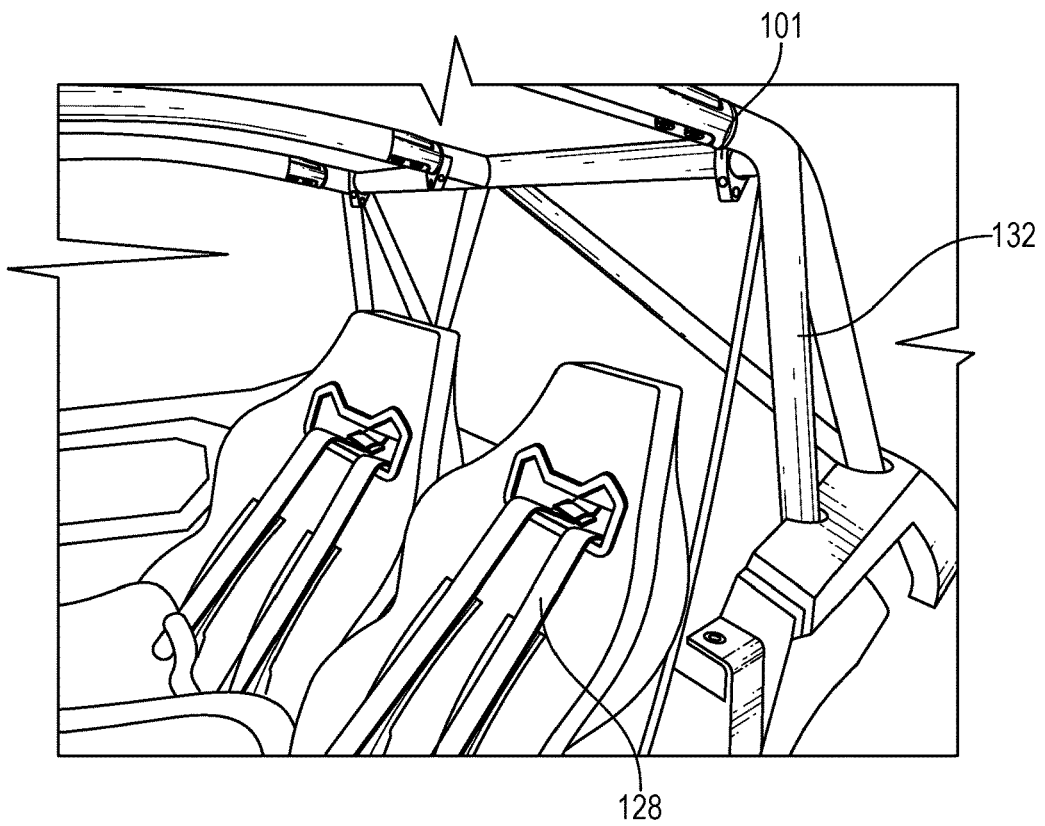
FIG. 6 illustrates a perspective view of a plurality of first harness couplers fastened to a vehicle with harness straps in a first position.
Figure 7:
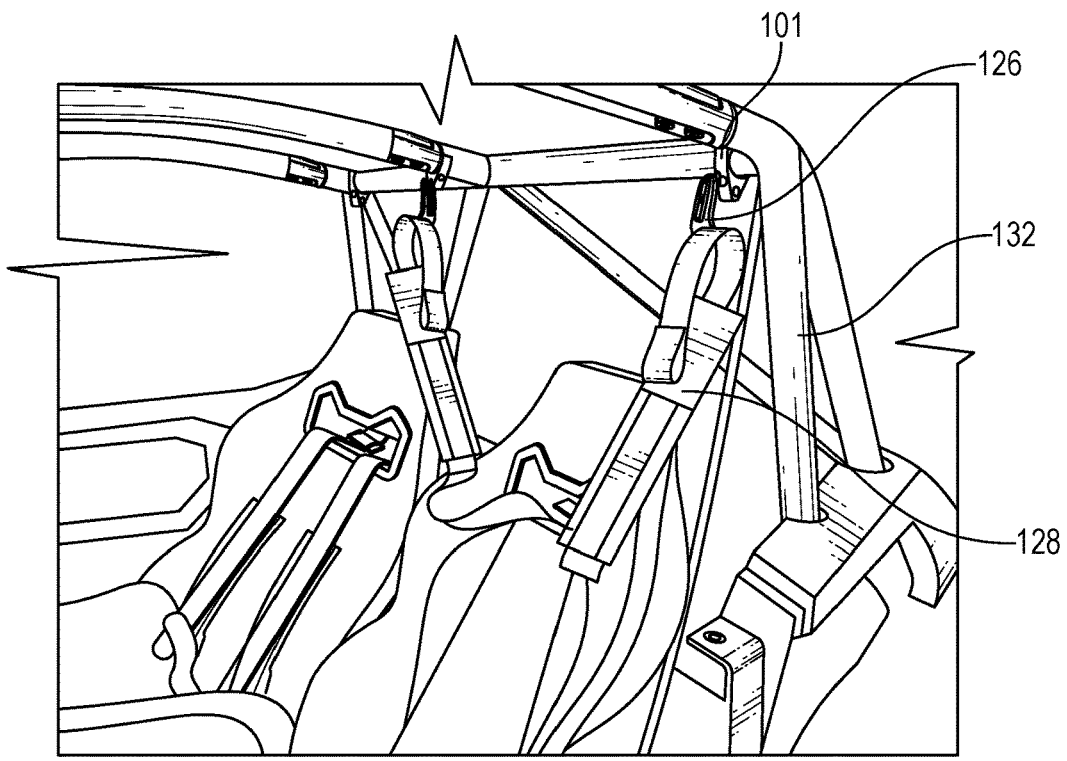
FIG. 7 illustrates a perspective view of a plurality of first harness couplers fastened to a vehicle with harness straps in a second position.
Figure 8:
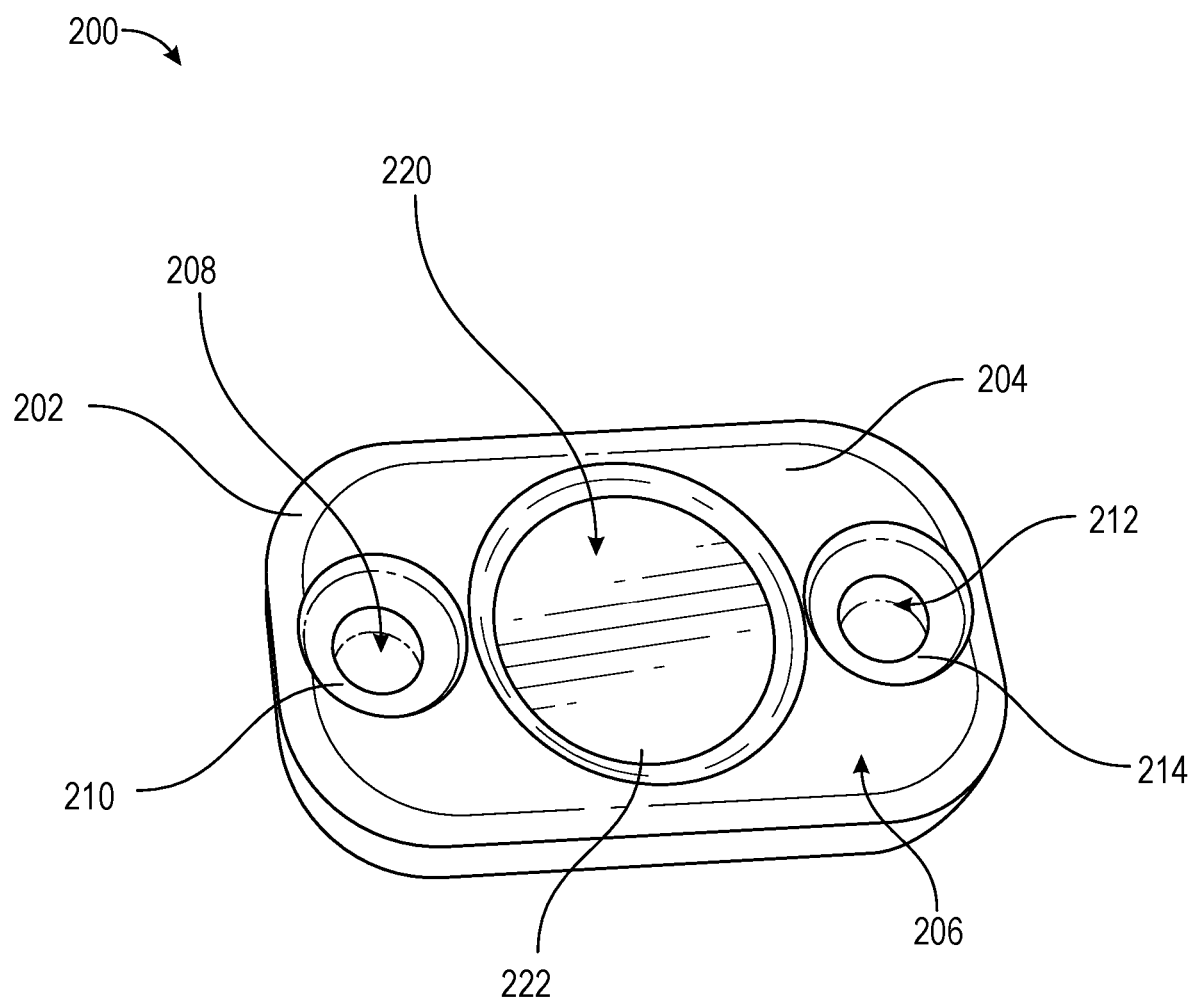
FIG. 8 illustrates a top perspective view of a second harness coupler of a safety belt and safety harness separating and fastening system.

As shown in FIGS. 4-5, in one embodiment, a method of using the first harness coupler 101 comprises attaching the coupler 101 to the tube 132 of a roll bar cage/frame 136. In particular, the first arm 102 and the second arm 104 may wrap around the tube 132 and be secured thereto via the fastener 122. When a user unbuckles the safety belt or safety harness 128, the user may attach the first latch plate 126 to the second fastener 124, thereby allowing a user an unobstructed exit from the vehicle. As illustrated in FIGS. 6-7, the safety harness 128 is in a first position 138, which is the safety harness in a downward resting, unbuckled position (i.e., typical use position). If a user attempts to use the safety harness in the first position 138, the user would have to sit on the seat and lift the straps of the safety harness to insert both arms thereunder. At times, a user has to untangle the belts or remove them from hard-to-reach locations. Accordingly, placing the safety harness 128 on a user when in the first position 138 may be time-consuming and frustrating if the straps are tangled. FIG. 8 illustrates the safety harness 128 in a second position 140, with the safety harness in an upward position, coupled to the first harness couplers 101. If a user enters the vehicle, the user can simply grab the shoulder straps of the harness 128, when in the second position, and pull it away from the first harness couplers 101 and over their shoulders to buckle, instead of having to untangle and maneuver to buckle the safety harness 128.

Figure 9:
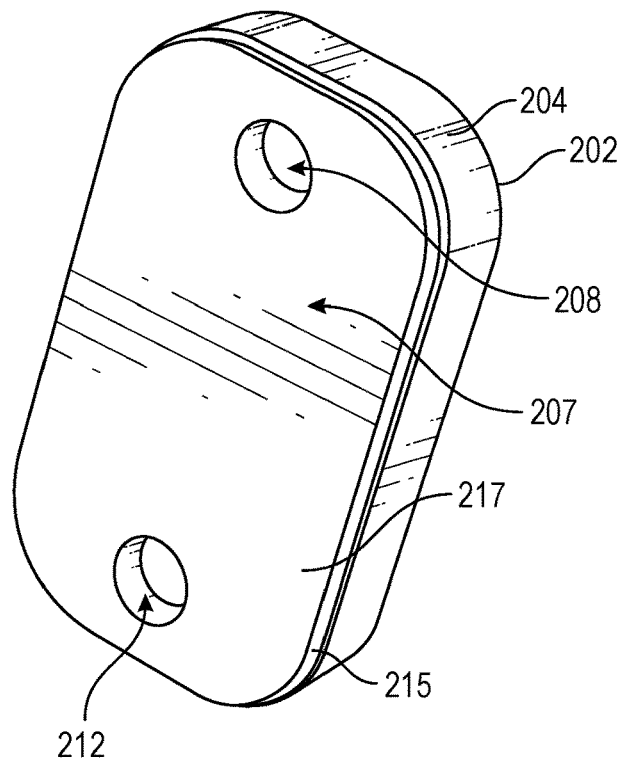
FIG. 9 illustrates a bottom perspective view of a second harness coupler of a safety belt and safety harness separating and fastening system.
Figure 10:
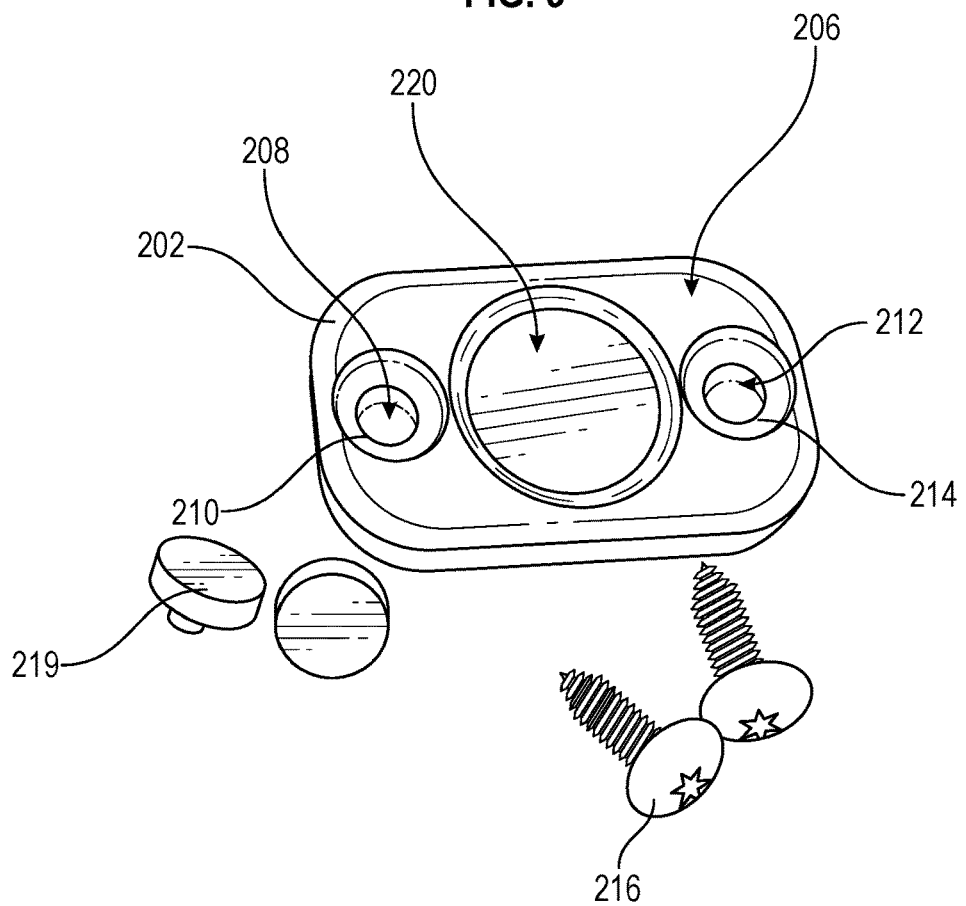
FIG. 10 illustrates a top perspective view of a second harness coupler of a safety belt and safety harness separating and fastening system.

In one embodiment, as illustrated in FIGS. 8-10, a system 200, which may be used in conjunction with the system 100, comprises a second harness coupler 202. The second harness coupler 202 may include a plate 204 with an upper surface 206 and a lower surface 207. The plate 204 may be rectangular-shaped, or any other shape. The upper surface 206 may comprise a first plate aperture 208 with a first recessed ledge 210 and a second plate aperture 212 with a second recessed ledge 214. The first aperture 208 and second aperture 212 may each receive a second fastener 216, such as a screw, so as to attach the coupler 202 to a vehicle 218. The upper surface 206 may also comprise a second coupler aperture 220 that is cylindrical, or any other shape, to receive and secure a second plate fastener 222. In some embodiments, the plate 204 may comprise a recessed area to receive the second plate fastener 222. The second fastener 222 may be a magnet. In some embodiments, the second plate fastener 222 may be hook and loop, adhesive, or any other securing mechanism. In some embodiments, the lower surface 207 may comprise an adhesive layer 215 that can attach the second harness coupler 202 to any surface with or without the first fasteners 216.

A release liner 217 may be releasably adhered to the adhesive layer 215 so as to protect it prior to use. When a user desires to apply the coupler 202 having the adhesive layer 215, the user may remove the release liner 217, exposing the adhesive layer, and adhere the second harness coupler 202 to a vehicle surface (e.g., interior roof or door). If the second fasteners 216 are not used, plugs 219 may be placed in the first plate aperture 208 and the second plate aperture 212 so as to prevent debris from entering therein.

The plugs 219 may be manufactured from rubber, metal, plastic, or any other type of material that can act as a plug.

In some embodiments, the second harness couplers 202 may comprise multiple sizes. Indica, such as numbers or colors, may be placed on the second harness couplers 202 to distinguish the various sizes.

Figure 11:
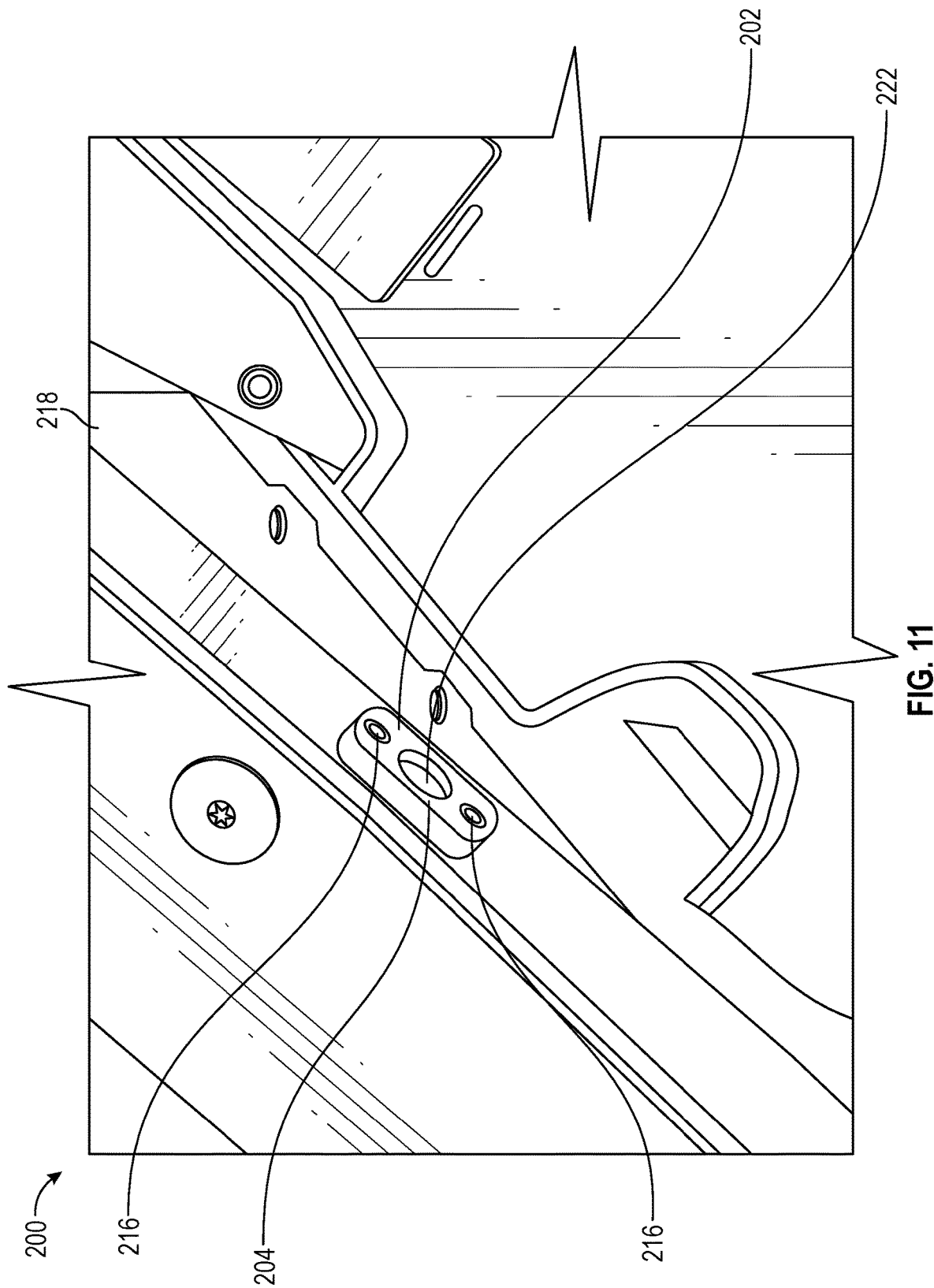
FIG. 11 illustrates a perspective view of a second harness coupler fastened to a vehicle.
Figure 12:
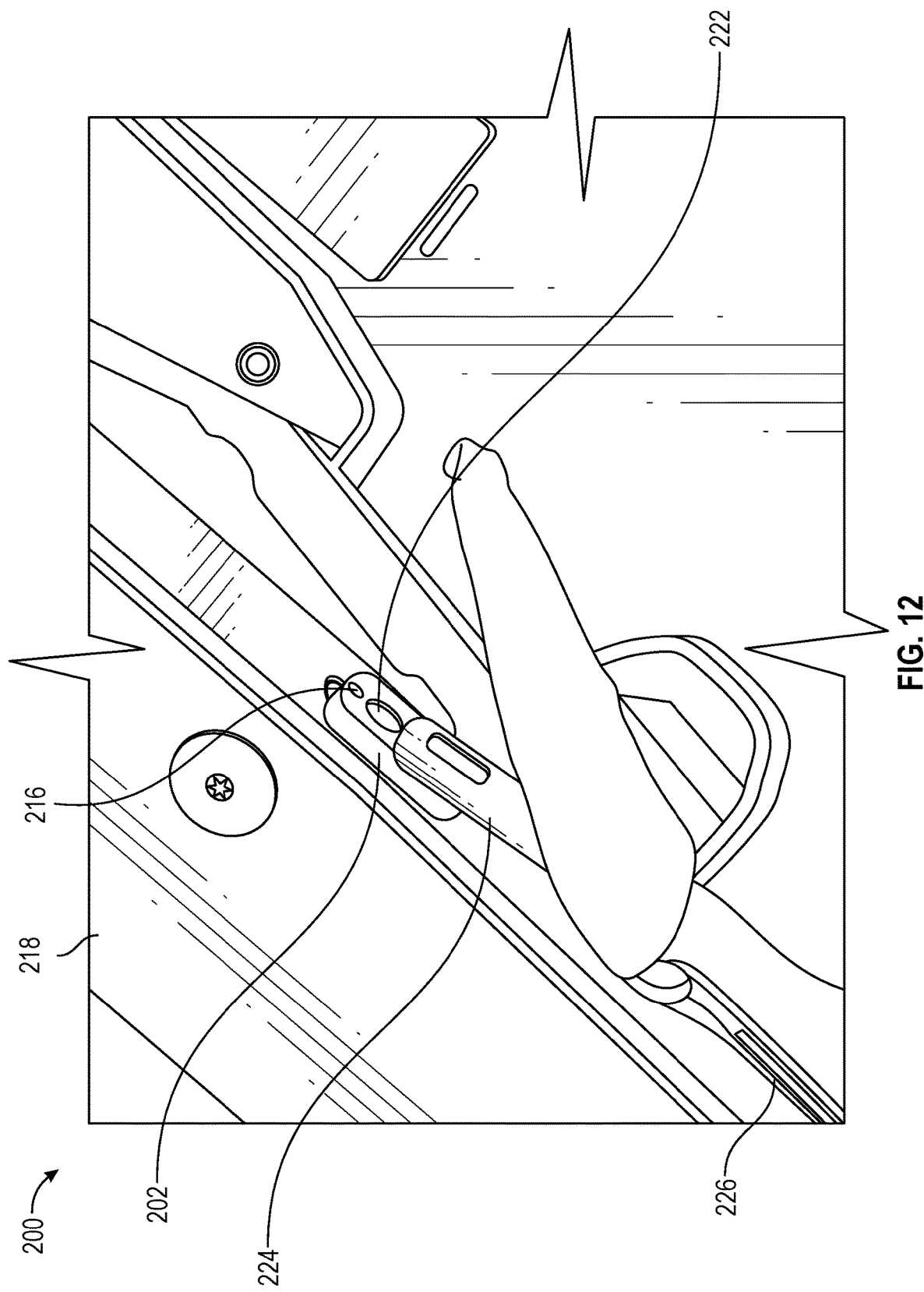
FIG. 12 illustrates a side perspective view of a second harness coupler with a second latch plate of a safety belt or harness attached thereto.

As shown in FIGS. 11-12, the coupler 202 may be attached to an interior surface of the vehicle 218. The coupler 202 may be attached to the vehicle 218 via the adhesive layer 215 and/or the second fastener 216 (e.g., a screw). Second latch plates 224 (e.g., waist belt latch plates) of a safety belt or safety harness 226 may be attached to the second plate fastener 222 on the coupler 202, allowing a user to easily access the safety belt or harness 226 and preventing damage to the belt or harness 226 and/or interior of the vehicle. To detach the latch plate 224, a user may simply pull it away from the second plate fastener 222.

It will be appreciated that the couplers 101, 202 or a magnet may be manufactured into a roll bar cage or in an interior of a vehicle. The couplers 101, 202 may be used together in a vehicle. For example, the coupler 101 may be used to receive first latch plates of a top portion of the harness (e.g., shoulder straps) and the coupler 202 may be used to receive second latch plates of a bottom portion of the harness (e.g., waist belt). In some embodiments, the couplers 101, 202 may be used independently. As an example, the second coupler 202 may be placed on a door or frame of a vehicle and on the interior roof so as to receive the first and second latch plates. The coupler 101, 202 allows a user to easily access a safety belt or harness in any type of vehicle. The coupler 101, 202 may also prevent damage to safety belts, safety harnesses, and vehicles by preventing the safety belts and harnesses from bouncing against the interior of the vehicle.

Figure 13:
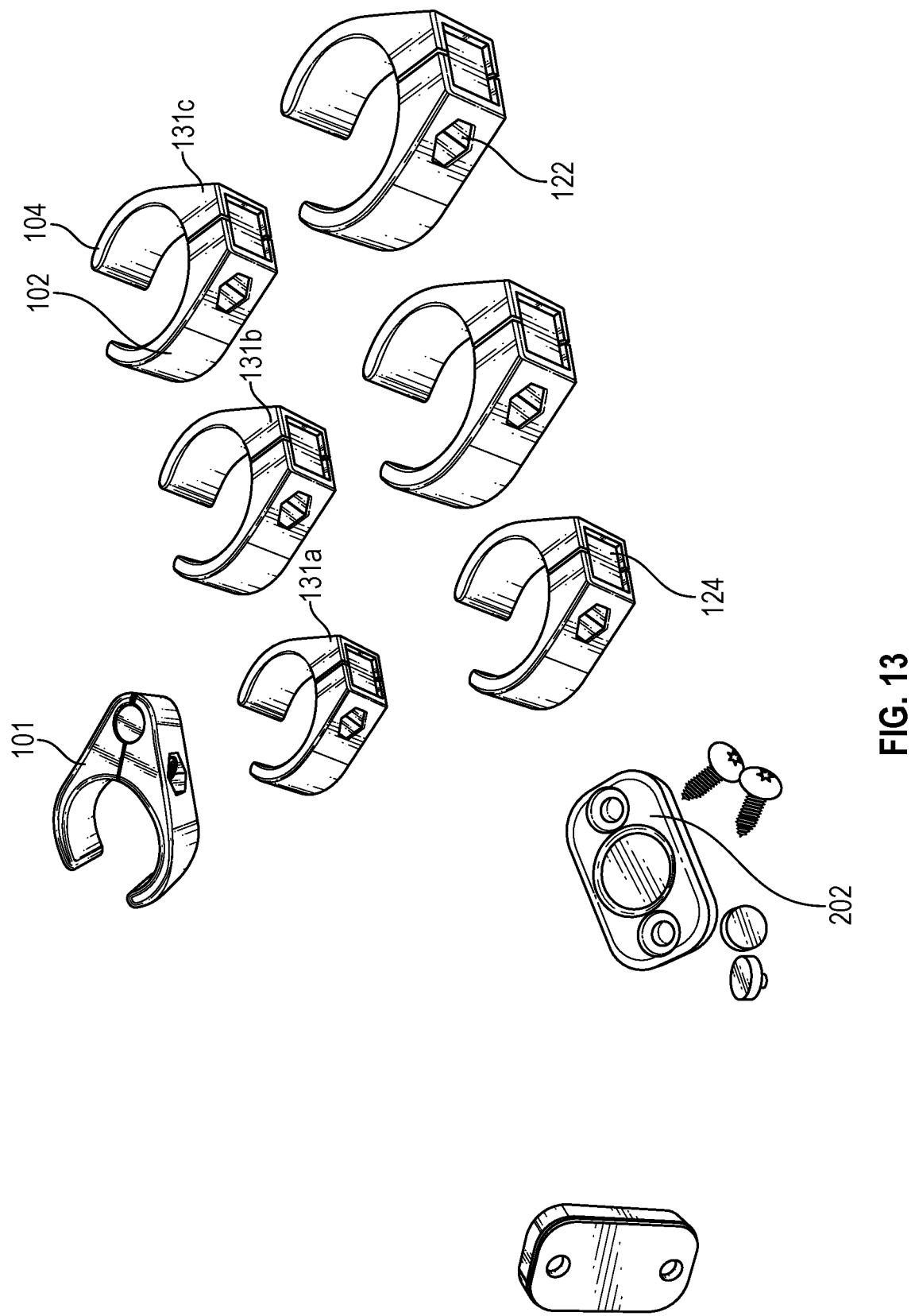
FIG. 13 illustrates a top perspective view of a plurality of first harness couplers and a plurality of second harness couplers.

As shown in FIG. 13, the systems 100 and 200 may be used together to keep a safety harness in an untangled, easy to access configuration. The systems 100, 200 may be placed in a housing for transportation.

Figure 14:
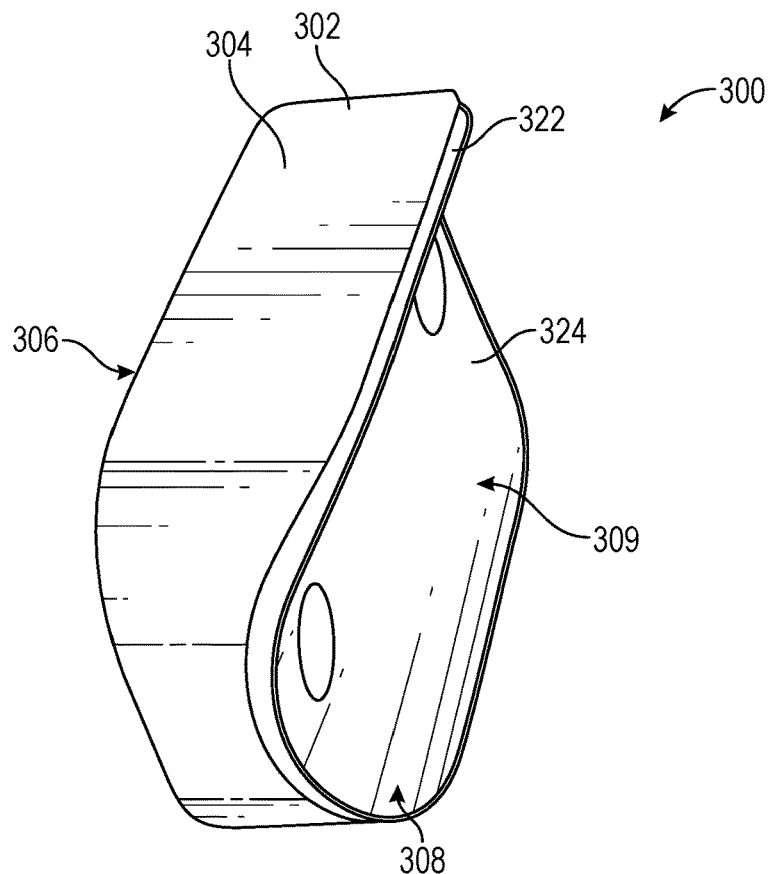
FIG. 14 illustrates a front, side perspective view of a third harness coupler of a safety belt and safety harness separating and fastening system.
Figure 15:
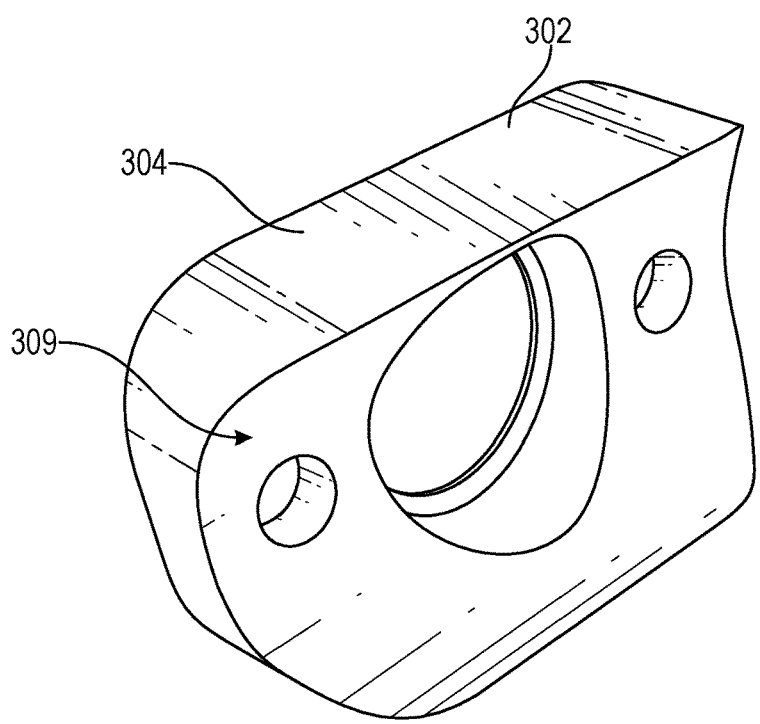
FIG. 15 illustrates a bottom perspective view of a third harness coupler of a safety belt and safety harness separating and fastening system.
Figure 16:
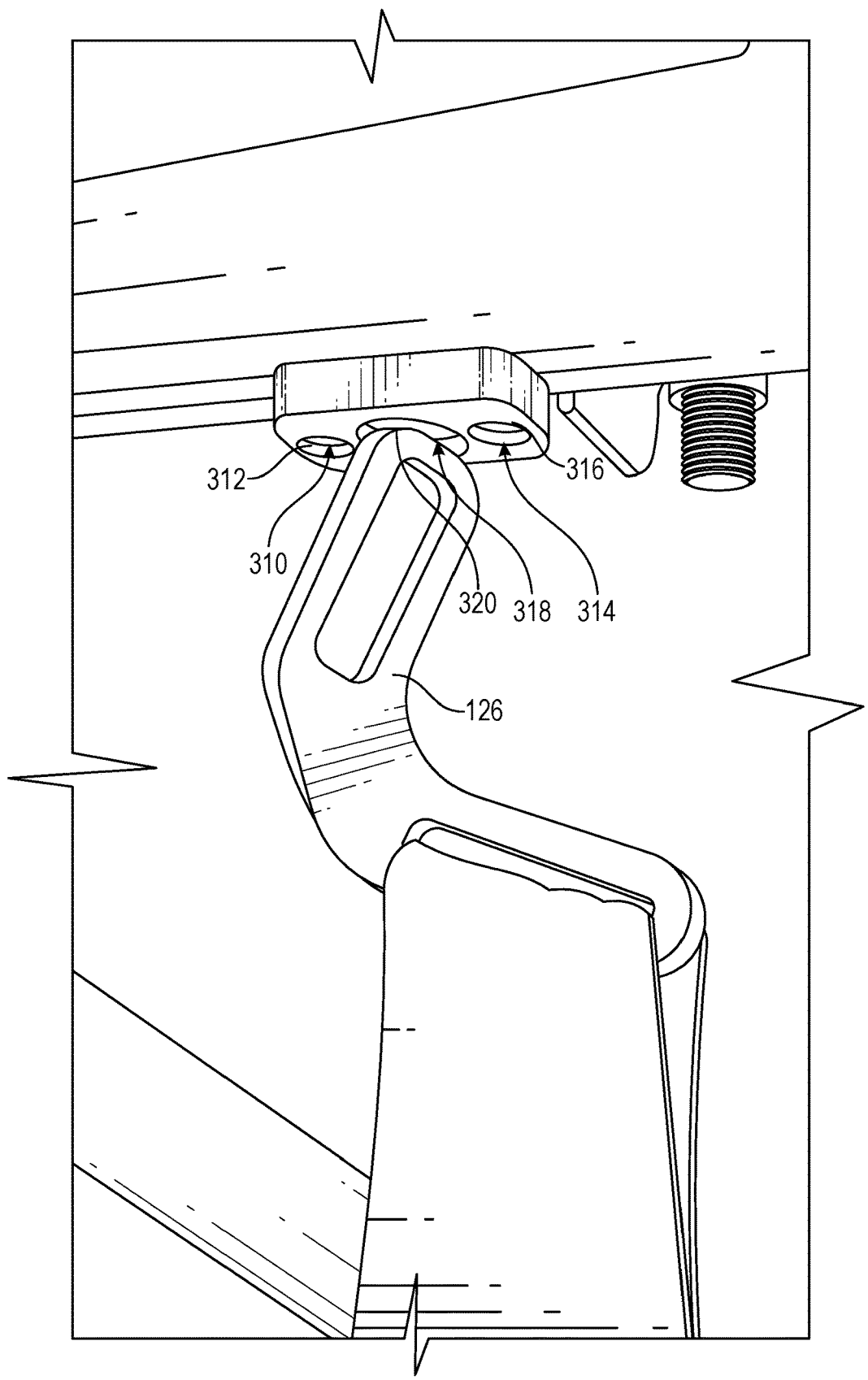
FIG. 16 illustrates a side perspective view of a third harness coupler attached to a frame of a vehicle.

In one embodiment, as illustrated in FIGS. 14-16, a system 300 comprises a third harness coupler 302, which may be used with the system 100 and/or 200, or by itself. The third harness coupler 302 may be similar in shape and function to the second harness coupler 202. The third harness coupler 302 may include a plate 304 with an upper surface 306 and a lower surface 308. The lower surface 308 may comprise a concave channel 309 either longitudinally or latitudinally. The concaved channel 309 may receive a tube of a vehicle frame or a roll bar cage. The third plate 304 may be rectangular or any other shape. The third upper surface 306 may comprise a third aperture 310 with a third recessed ledge 312 and a fourth aperture 314 with a fourth recessed ledge 316. The third aperture 310 and fourth aperture 314 may each receive a third fastener, such as a screw, so as to attach the coupler 302 to a vehicle 218. The upper surface 306 may also comprise a third coupler aperture 318 that may be cylindrical, or any other shape, to receive a third plate fastener 320. The third plate fastener 320 may be a magnet. In some embodiments, the third plate fastener 320 may be hook and loop, adhesive, or any other securement mechanism. Furthermore, the third lower surface 308 may comprise a third adhesive layer 322 that can attach the third harness coupler 302 to any surface with or without the third fastener. A third release liner 324 may be coupled to the adhesive layer 322 so as to protect it. When a user desires to apply the coupler 302 having the adhesive layer 322, the user may remove the release liner 324 and adhere the coupler 302 to a vehicle frame or interior surface.

The third harness coupler 302 may be used to receive the first latches 126 of the harness and in some instances, the second latch plates 224.

It will be appreciated that couplers 101, 202, and 302 may each be covered in a noise-reducing material. For example, the coupler 101, 202, 302 may comprise a silicone coating to reduce noise when a latch of a safety belt or harness contacts the coupler 101, 202, 302. In some embodiments, section of an interior of a vehicle may be manufactured with magnets to receive a safety belt or safety harness latch.

Further, in some embodiments, the first and second latch plates may comprise a latch fastener (e.g., a magnet or hook and loop) so as to increase the bond strength between the latch plates and the first, second, and third harness couplers.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A safety harness separating and fastening system, the system comprising:
   one or more second harness couplers that attach to an interior of the vehicle to receive second latch plates of a bottom/waist portion of a harness, the one or more second harness couplers comprising:
   a plate with an upper surface and a lower surface, the plate comprising a first plate aperture with a first recessed ledge and a second plate aperture with a second recessed ledge;
   a second coupler aperture interposed between the first plate aperture and the second plate aperture; and
   a second plate fastener positioned in the second coupler aperture;
   one or more third harness couplers that attach to an upper frame of the vehicle to receive first latch plates of an upper/shoulder portion of the harness, the one or more third harness couplers comprising:
   a third plate with a third upper surface and a third lower surface, the third plate comprising a third harness plate aperture with a third recessed ledge and a fourth plate aperture with a fourth recessed ledge;
   a concave channel on the third lower surface that receives a tube of the upper frame of the vehicle;

a third coupler aperture interposed between the third plate aperture and the fourth plate aperture; and a third plate fastener positioned in the third coupler aperture.

2. The system of claim 1, wherein the one or more second harness couplers comprise an adhesive layer on the lower surface.

3. The system of claim 2, wherein the adhesive layer comprises a releasably adhered release liner.

4. The system of claim 1, wherein the first plate aperture and the second plate aperture both receive second fasteners to couple the one or more second harness couplers to the interior of the vehicle.

5. The system of claim 1, wherein the second plate fastener comprises a magnet.

6. The system of claim 1, wherein the one or more third harness couplers comprise a third adhesive layer on the third lower surface.

7. The system of claim 6, wherein the third adhesive layer comprises a releasably adhered third release liner.

8. The system of claim 1, wherein the third plate aperture and the fourth plate aperture both receive third fasteners to couple the one or more third harness couplers to the upper frame of the vehicle.

9. The system of claim 1, wherein the third plate fastener comprises a magnet.

\* \* \* \* \*